United States Patent [19]

Chandler et al.

[11] Patent Number: 5,577,388

[45] Date of Patent: *Nov. 26, 1996

[54] AQUEOUS ABSORPTION FLUIDS

[75] Inventors: Travis Chandler; Uwe Rockenfeller, both of Boulder City, Nebr.

[73] Assignee: Rocky Research, Boulder City, Nebr.

[ * ] Notice: The term of this patent shall not extend beyond the expiration date of Pat. No. 5,419,145.

[21] Appl. No.: 443,707

[22] Filed: May 18, 1995

Related U.S. Application Data

[63] Continuation-in-part of Ser. No. 180,712, Jan. 13, 1994, Pat. No. 5,419,145.

[51] Int. Cl.$^6$ ............................... F25B 15/00; C09K 5/00
[52] U.S. Cl. ................... 62/112; 62/476; 252/69
[58] Field of Search ................... 62/112, 476; 252/67, 252/69

[56] References Cited

U.S. PATENT DOCUMENTS

| | | | |
|---|---|---|---|
| 2,308,665 | 1/1943 | Zellhoefer et al. | 252/69 |
| 3,949,566 | 4/1976 | Hopkins | 62/475 |
| 3,977,204 | 8/1976 | Bourne | 62/85 |
| 4,100,755 | 7/1978 | Leonard | 62/2 |
| 4,341,084 | 7/1982 | Rojey et al. | 62/101 |
| 4,455,247 | 6/1984 | Nakayama et al. | 252/67 |
| 4,475,353 | 10/1984 | Lazare | 62/101 |
| 4,557,850 | 12/1985 | Ando et al. | 252/68 |
| 4,614,605 | 9/1986 | Erickson | 252/69 |
| 4,823,864 | 4/1989 | Rockenfeller | 165/104.12 |
| 4,966,007 | 10/1990 | Osborne | 62/101 |
| 5,033,274 | 7/1991 | Erickson | 62/476 |
| 5,038,574 | 8/1991 | Osborne | 62/101 |
| 5,186,009 | 2/1993 | Rockenfeller | 62/112 |
| 5,335,515 | 8/1994 | Rockenfeller | 62/476 |
| 5,390,509 | 2/1995 | Rockenfeller | 62/476 |
| 5,419,145 | 5/1995 | Chandler et al. | 62/112 |
| 5,467,614 | 11/1995 | DeVault | 62/476 |

FOREIGN PATENT DOCUMENTS

| | | |
|---|---|---|
| 3142454A1 | 5/1983 | Germany. |
| WO93/11393 | 6/1993 | WIPO. |

OTHER PUBLICATIONS

"Air Cooled Absorption Chillers For Solar Cooling Applications", W. Bierman, et al., Pub. Sep., 1982.

*Primary Examiner*—William Doerrler
*Attorney, Agent, or Firm*—Jerry R. Seiler

[57] ABSTRACT

The rate of water vapor sorption of an absorption cycle cooling and/or heating system using an aqueous alkali metal halide or hydroxide solution as the working fluid is increased by adding to the fluid an effective additive amount of at least 2 parts per million of a primary, secondary or tertiary aliphatic, cycloaliphatic, heterocyclic or aromatic amine to the fluid capable of increasing the rate of water vapor absorption.

89 Claims, No Drawings

AQUEOUS ABSORPTION FLUIDS

This application is a continuation-in-part of application Ser. No. 08/180,712 filed Jan. 13, 1994, U.S. Pat. No. 5,419,145.

BACKGROUND OF THE INVENTION

In the aforesaid co-pending application, there is disclosed the use of amines as additives for improving and increasing the rate of water vapor absorption in absorption cycle cooling and/or heating systems. In the aforesaid application, the working fluid is an aqueous alkali metal hydroxide solution. The present invention includes the use of amines as effective additives in aqueous absorption working fluids where other metal salts are used in the absorption solution.

SUMMARY OF THE INVENTION

According to the present invention primary, secondary and tertiary aliphatic, cycloaliphatic, heterocyclic and aromatic amines are highly effective heat and mass transfer additives in aqueous metal salt and alkali metal hydroxide solutions used in water vapor absorption cycle systems. The presence of such amines increases the rate of water vapor absorption by the aqueous metal salt absorption fluids thereby achieving important advantages and improvements in system performance. The improvements include absorber power load increases and improvements in the change of absorber fluid concentrations. Further improvements include increase in overall heat transfer coefficients and sorption fluid side film heat transfer coefficients. The advantage of such improved absorption fluid performance allows for reduction of sorber heat exchange surface areas needed to satisfy a given load resulting in reduction of absorber size and costs. These and other improvements and advantages will be evident from the following detailed description.

DETAILED DESCRIPTION OF THE INVENTION

The specific improved aqueous absorption solutions used in the systems of the present invention are aqueous solutions of metal salt or alkali metal hydroxide solutions in which water is substantially the only solvent. By this description, it is intended to exclude those solutions containing additional solvents such as glycols, polyglycols, alcohols, glycol ethers, glycerol and the like in solvent amounts. The preferred metal salts are alkali metal halides, particularly lithium bromide, lithium chloride and lithium iodide and mixtures of two or more of them. The most preferred working fluid is an aqueous solution of lithium bromide as the only absorbent present in the aqueous solution. However, in addition to the preferred lithium bromide, one or more of the following salts may also be present: $ZnCl_2$, $ZnBr_2$, $MnCl_2$, $MnBr_2$, $MgCl_2$, $MgBr_2$, $SrCl_2$, $SrBr_2$, $CaCl_2$, $CaBr_2$, $FeCl_2$, $FeBr_2$, $LiCl$, $LiI$, $LiNO_2$, $LiNO_3$, $LiSCN$ and $LiClO_3$. The amount of salt present, whether lithium bromide alone or a mixture of two or more of the aforesaid salts is preferably between about 40% and about 85%, by weight. However, the presence of calcium in the absorption fluid may cause precipitation of some amines which may make such systems unattractive. The aforesaid LiBr aqueous absorption solutions are well known to those skilled in the art as disclosed, for example, in U.S. Pat. No. 3,478,530.

The alkali metal hydroxide absorption fluids are aqueous solutions of sodium hydroxide, potassium hydroxide or mixtures thereof. Preferred hydroxide compositions are those utilizing a mixture of the two hydroxides, and preferably those in which the total hydroxide concentration is between about 30% and about 80%, by weight. It has been found that optimum energy storage potentials are realized when sodium hydroxide is present between about 35% and about 75%, by weight, of the combined sodium hydroxide and potassium hydroxide weight. The amount of sodium hydroxide present in the salt mixture for systems at crystallization temperatures above 30° C. is 50% or above, whereas for temperatures below 30° C., the preferred amount of sodium hydroxide is at or below 50% of the salt mixture. The most preferred amount of sodium hydroxide is between 40% and 55% of the combined weight of sodium hydroxide and potassium hydroxide for crystallization temperatures below 30° C. In addition to the aforesaid sodium and/or potassium hydroxide solutions, relatively small amounts of other alkali metal hydroxides may be added as well. Thus, the hydroxide solutions may contain up to about 10–15% cesium, rubidium, and/or lithium hydroxide, based on the weight of sodium and/or potassium hydroxides.

The heat and mass transfer additives of the invention are primary, secondary or tertiary aliphatic, cycloaliphatic, heterocyclic or aromatic amines. Preferred amines are those that are normally liquid at system operating conditions, for example, between about 30° C. and up to 100° C. or more. Additives of the present invention may be used in systems with absorber temperatures of about 20° C. or less if they are selected from those amines with a melting point less than the absorber temperature. The additives may be liquid over a wider temperature range, both higher and lower, without adversely affecting the operation of the invention. Thus, for example, aniline is a satisfactory additive, with a freezing point of −6° C. and a normal boiling point of 184° C. The amines may contain one amine functional group, or may have multiple amine groups including two, three or more functional groups in the same molecule. Preferred amine additives, according to the invention, are aliphatic and aromatic amines, preferably having between four and twenty and more preferably between six and twelve carbon atoms. For the alkali metal halides, and particularly the lithium bromide solutions, the most preferred amines are ethylhexylamine, N,N-dimethyloctylamine, aniline and benzylamine. Other examples of useful aliphatic amines include tert-octylamine, n-octylamine, di-sec-butylamine, pentylamine, butylmethylamine, dipropylamine, butylethylamine, triethylamine, pentylethylamine, hexylamine, cyclohexylamine, trans-1,2-diaminocyclohexane, N,N-diethylcyclohexylamine, 1,5-dimethylhexylamine, N,N-dimethylhexylamine, N-methyldibutylamine, nonylamine, N,N,diisopropylethylamine and 2-methyl-1,5-diaminopentane and others disclosed in the aforesaid application and incorporated herein by reference. A most preferred amine additive for the lithium bromide absorption solutions of the invention is 2-ethylhexylamine. Other preferred primary amines include cycloaliphatic or alicyclic amines such as cyclohexylamine and diaminocyclohexane and its different isomers. Other particularly useful and effective amines include secondary aliphatic and saturated cyclic or heterocyclic amines of 4–12 carbon atoms such as dialkylamines, piperidine and substituted piperidines, and pyrrolidine and substituted pyrrolidines. Preferred derivatives are alkyl or halogen substituted. Another preferred group of amines include tertiary aliphatic and saturated heterocyclic amines such as N,N-dimethytoctylamine, N,N-diethyloctylamine, N,N-disopropylethylamine, and N-methylpiperidine. Another useful group are the aromatic amines such as aniline, and substituted anilines such as 3,5-bis-trifluoromethylaniline, 2,3,4, 5,6-pentafluoroaniline, and the different isomers of toluidine and anisidine. The aromatic amines may be polycyclic such as α-naphthylamine and β-naphthylamine, and alkyl substituted napthylamines. Unsaturated heterocyclic and aromatic nitrogen compounds such as quinoline, isoquinoline, pyrrole, pyrroline, and pyridine, and alkyl and halogen-substituted heterocyclic aromatics, particularly methyl and fluorine substituted derivatives, are also useful and preferred additives of the invention. Other active nitrogen compounds included aliphatic and aromatic nitriles such as benzonitrile, tolunitrile, and octylnitrile.

From the aforesaid specific examples, it will be noted that the amino compounds may have one or more amine functional groups in the same molecule. However, not all polyfunctional amine additives will be active with all fluids. Particularly for lithium containing solutions, it is important to avoid additives that form a chelation complex with the cations of the absorbent thereby reducing or preventing heat and mass transfer activity. For example, 1,2-diaminocyclohexane can form a five-membered ring in $LiBrH-H_2O$, consisting of the lithium atom, the two amine nitrogen atoms, and carbon atoms number 1 and 2 on the cyclohexane ring. Thus, five, six and seven-membered rings are to be avoided with lithium. The tendency toward chelate formation with additives is more prevalent with LiBr solutions than with metal hydroxide solutions such as $NaOH-H_2O$. For example, while 1,2-diaminocyclohexane is an active additive for NaOH and KOH solutions, and mixtures thereof as shown in application Ser. No. 08/180,712, it is not active with $LiBr-H_2O$ solutions. The capability of a polyfunctional additive to form such rings will be obvious to those practitioners skilled in the chemical art. The amine molecule may also include one or more other functional groups such as alcohols, halogens, thiols, ethers, and ketones, provided such functional groups do not cause the amine to form a precipitate or otherwise induce chemical instability in the presence of the metal halide or hydroxide solutions. It is also to be understood that the specific amines disclosed are given by way of example only, and any of the aforesaid amines or combinations thereof within the disclosed groups of amines may be used.

The effective additive amounts of amine additive added to the aqueous salt solutions for the purpose of improving heat and mass transfer is from at least about two parts per million and preferably up to about 20,000 ppm, by weight. Preferred concentrations are between about 2 ppm and 10,000 ppm and more preferably between about 5 ppm and about 5,000 ppm, although amounts in excess of this range up to 20,000 ppm or more will not adversely affect the system operation. Mixtures of the aforesaid amine additives may also be used. In addition to mixtures of the amines other known additives such as 2-ethylhexanol may also be added where a mixture of additives is desired or where another additive such as 2-ethylhexanol is already present in the absorption fluid.

According to the invention, it has been found that the presence of an amine in the aqueous absorption fluid containing a lithium halide or the sodium or potassium hydroxides, or mixtures of the hydroxides results in substantially improved heat and mass transfer performance of the absorption working fluid composition. Specifically, the performance of the system improves in the following manner: water cooling temperature change in the absorber, for a constant water flow rate, rises significantly; the absorber power load increases proportional to the change in water cooling temperature; the steady state vapor pressure drops, and if brought back to its initial value to achieve a constant evaporator temperature, the change in concentration of the absorber fluid increases significantly; the absorber solution subcooling, i.e., the difference between the maximum temperature at equilibrium (saturation) and the actual solution temperature, is decreased by several degrees; the absorber solution-heat exchanger tube interface comprises a highly agitated turbulent film as compared to a generally laminar flow pattern without presence of the additive; and overall heat transfer coefficients and sorption fluid film heat transfer coefficients are increased.

As previously noted, water vapor absorption systems incorporating the amine heat and mass transfer additives in the aqueous alkali metal absorption solutions of the invention include a number of different types of systems incorporating one or more absorbers in which water vapor absorption solutions are typically used. Such equipment includes absorption chillers and refrigeration systems as disclosed in U.S. Pat. Nos. 4,966,007, 5,038,574 and 5,186,009, thermal energy storage systems as disclosed in U.S. Pat. No. 4,823,864, as well as multiple effect absorption refrigeration systems, for example, double effect and dual loop systems disclosed in U.S. Pat. Nos. 3,266,266 and 4,542,628 and triple effect systems disclosed in U.S. Pat. Nos. 5,335,515 and 5,390,509. The description of the apparatus and systems disclosed in the aforesaid application and patents are incorporated herein by reference. Especially preferred are the single and double effect absorption chiller and refrigeration systems which includes those systems in which the single or double effect components are a portion of the system, such as a dual loop triple effect system comprising combined single stage loops as disclosed in U.S. Pat. No. 4,732,008. The aqueous working fluids of the invention may also contain a corrosion inhibitor such as chromates, nitrates, tungstates or molybdates, as disclosed for example in U.S. Pat. Nos. 5,186,009 and 5,335,515 or other suitable corrosion inhibitors.

To illustrate the improvement of system performance by using the heat and mass transfer additives of the present invention, the following examples are provided. In the Table, amine additives within the scope of the present invention are shown by way of example. The results given are for a constant set of operating conditions and include: initial cooling water ("Tube") temperature of 30° C., a system water vapor pressure of 10 mbar, 7° C. dew point (evaporator temperature), initial aqueous solution concentration of 60% LiBr, initial solution flow rate of 400 grams/min, and initial solution temperature of 48° C. entering the absorber, using a special bench test absorption machine. The solution flow rate used for nonylamine is 300 grams/min and for pyridine 500 grams/min. The water and solution temperatures, flow rates and vapor pressures are taken from monitor readings during operation. The concentrations are determined from fluid samples taken from the machine.

The results are based on heat transfer equations well known to practitioners of the art. The absorber load dQ/dt, shown as W, is calculated from the water temperature, heat capacity of water, and water flow rates, $$\frac{dQ}{dt} = (T_{H_2O,out} - T_{H_2O,in}) * C_p(H_2O) * \frac{dm_{H_2O}}{dt} \quad (1)$$

For the heat transfer coefficients, the temperature change is treated as the log mean differential temperature, where $$LMDT = \frac{(T_{Sol,in} - T_{H_2O,out}) - (T_{Sol,out} - T_{H_2O,in})}{\ln(T_{Sol,in} - T_{H_2O,out}) - \ln(T_{Sol,out} - T_{H_2O,in})} \quad (2)$$

The outside film heat transfer coefficient $h_o$ is calculated from $$h_o = \frac{1}{\frac{1}{U_o} - R_{i,m}}\quad(3)$$

where $$U_o = \frac{\frac{dQ}{dt}}{LMDT * (\text{tube area})}\quad(4)$$

and where $R_{i,m}$ is the thermal resistivity of the inside cooling water and copper metal tube wall. Solution subcooling is the temperature difference ($\Delta T$) between the actual solution temperature leaving the absorber and the calculated absorber solution equilibrium temperature at the measured concentration and system vapor pressure values. Thus, lower subcooling temperature values reflect greater system efficiency as do increased outside film heat transfer coefficients, $h_o$. The value calculated for solution subcooling is one measure of the efficiency of the system for water vapor absorption, with lower subcooling temperatures indicating an improvement. However, under certain conditions, the derived subcooling numbers may be contrary to other direct measurements of water vapor absorption. In the Table some data show higher calculated solution subcooling while also showing increased water vapor absorption rates by increases in absorber loads, and increases in heat transfer coefficients. Thus, the derived subcooling results are to be checked against other direct evidence of increased absorption rates.

TABLE

| Additive | ppm | Load W | ho W/m2K | Subcooling °C. |
|---|---|---|---|---|
| nonylamine | 0 | 417 | 1099 | 9.4 |
| | 0 | 512 | 1291 | 7.1 |
| | 0 | 540 | 1595 | 6.6 |
| | 15.7 | 563 | 1208 | 6.4 |
| | 15.7 | 509 | 1092 | 5.4 |
| | 26 | 678 | 1535 | 5.5 |
| | 26 | 671 | 1610 | 5.1 |
| | 36 | 760 | 1651 | 4.2 |
| | 36 | 752 | 1588 | 3.6 |
| | 46 | 787 | 1570 | 3.1 |
| | 46 | 780 | 1676 | 5.0 |
| | 56 | 780 | 1619 | 3.5 |
| | 56 | 824 | 1872 | 3.9 |
| | 66 | 849 | 1886 | 3.3 |
| | 66 | 859 | 1859 | 2.5 |
| | 80 | 843 | 1932 | 3.7 |
| | 80 | 831 | 1927 | 3.9 |
| | 100 | 870 | 2225 | 3.7 |
| | 100 | 763 | 1759 | 5.9 |
| | 100 | 768 | 1742 | 4.6 |
| | 154 | 705 | 1704 | 5.3 |
| | 154 | 756 | 1845 | 4.9 |
| | 199 | 786 | 1976 | 4.6 |
| | 199 | 809 | 2047 | 3.9 |
| | 199 | 857 | 2308 | 4.5 |
| | 199 | 870 | 2402 | 3.7 |
| | 253 | 868 | 2449 | 3.7 |
| | 253 | 865 | 2506 | 4.3 |
| | 299 | 884 | 2360 | 4.5 |
| | 299 | 911 | 2563 | 3.7 |
| | 1002 | 896 | 2548 | 4.1 |
| | 1002 | 894 | 2644 | 4.1 |
| 2-ethylhexylamine | 0 | 898 | 1330 | 7.77 |
| | 0 | 919 | 1197 | 5.26 |
| | 5 | 1521 | 2351 | 2.85 |
| | 5 | 1525 | 2269 | 2.07 |
| | 10 | 1730 | 2842 | 1.70 |
| | 10 | 1698 | 2756 | 2.13 |
| | 20 | 1831 | 3129 | 2.06 |
| | 20 | 1842 | 3042 | 1.51 |
| | 50 | 1927 | 3818 | 1.90 |
| | 50 | 1941 | 3742 | 1.68 |
| | 100 | 1897 | 4095 | 1.79 |
| | 100 | 1934 | 4011 | 1.84 |
| | 200 | 1892 | 3686 | 1.78 |
| | 200 | 1884 | 3811 | 2.08 |
| | 300 | 1745 | 4201 | 3.97 |
| | 300 | 1785 | 4410 | 3.48 |
| | 400 | 1799 | 3995 | 2.92 |
| | 400 | 1862 | 3852 | 3.06 |
| | 500 | 1847 | 3825 | 2.54 |
| | 500 | 1852 | 3824 | 1.31 |
| | 600 | 1860 | 3827 | 3.39 |
| | 600 | 1836 | 3642 | 2.54 |
| | 1000 | 1807 | 3628 | 3.49 |
| | 1000 | 1806 | 3683 | 2.76 |
| N,N-diisopropylethylamine | 0 | 1014 | 1566 | 7.43 |
| | 0 | 1045 | 1598 | 6.79 |
| | 0 | 1041 | 1366 | 5.60 |
| | 0 | 1061 | 1414 | 5.89 |
| | 0 | 1038 | 1426 | 6.01 |
| | 0 | 1047 | 1470 | 6.41 |
| | 5 | 1149 | 1673 | 5.72 |
| | 5 | 1161 | 1704 | 5.67 |
| | 10 | 1281 | 1746 | 4.06 |
| | 10 | 1288 | 1737 | 4.31 |
| | 20 | 1364 | 1900 | 3.71 |
| | 20 | 1381 | 1932 | 4.23 |
| | 50 | 1341 | 1973 | 3.68 |
| | 50 | 1359 | 2022 | 4.18 |
| | 100 | 1423 | 2245 | 4.47 |
| | 100 | 1434 | 2285 | 4.37 |
| | 200 | 1497 | 2634 | 4.99 |
| | 200 | 1505 | 2619 | 5.02 |
| | 300 | 1450 | 2789 | 5.89 |
| | 300 | 1468 | 2878 | 5.66 |
| | 400 | 1494 | 2990 | 5.56 |
| | 400 | 1513 | 3010 | 5.80 |
| | 600 | 1487 | 3131 | 6.30 |
| | 600 | 1501 | 3127 | 6.42 |
| N,N-dimethyloctylamine | 0 | 967 | 1211 | 4.97 |
| | 0 | 991 | 1253 | 5.01 |
| | 0 | 997 | 1239 | 4.86 |
| | 0 | 1079 | 1461 | 4.26 |
| | 0 | 1116 | 1552 | 4.77 |
| | 0 | 1133 | 1608 | 5.18 |
| | 0 | 1141 | 1525 | 4.51 |
| | 0 | 1155 | 1597 | 5.00 |
| | 0 | 1075 | 1432 | 4.15 |
| | 5 | 1366 | 2077 | 3.30 |
| | 5 | 1396 | 2127 | 3.72 |
| | 10 | 1486 | 2527 | 3.75 |
| | 10 | 1527 | 2632 | 3.44 |
| | 20 | 1621 | 2771 | 2.75 |
| | 20 | 1626 | 2826 | 3.32 |
| | 50 | 1677 | 3083 | 3.92 |
| | 50 | 1657 | 3212 | 4.35 |
| | 50 | 1660 | 3166 | 4.30 |
| | 100 | 1613 | 3052 | 4.30 |
| | 100 | 1602 | 3016 | 3.89 |
| | 150 | 1601 | 3229 | 4.15 |
| | 150 | 1595 | 3169 | 4.46 |
| aniline | 0 | 911 | 1224 | 7.31 |
| | 0 | 983 | 1321 | 7.31 |
| | 0 | 966 | 1217 | 8.14 |
| | 0 | 954 | 1088 | 5.35 |
| | 10 | 954 | 1331 | 7.91 |
| | 10 | 977 | 1328 | 7.77 |
| | 10 | 978 | 1362 | 7.61 |
| | 20 | 1055 | 1533 | 6.96 |
| | 20 | 1067 | 1563 | 6.86 |
| | 20 | 1072 | 1552 | 7.05 |
| | 50 | 1312 | 2213 | 6.60 |
| | 50 | 1345 | 2271 | 6.68 |
| | 50 | 1357 | 2319 | 6.52 |
| | 100 | 1564 | 3147 | 6.18 |

TABLE-continued

| Additive | ppm | Load W | ho W/m2K | Subcooling °C. |
|---|---|---|---|---|
| | 100 | 1551 | 3091 | 5.98 |
| | 100 | 1555 | 3134 | 5.88 |
| | 100 | 1563 | 3101 | 5.98 |
| | 200 | 1620 | 3616 | 6.15 |
| | 200 | 1686 | 3708 | 6.75 |
| | 200 | 1674 | 3675 | 6.73 |
| | 200 | 1656 | 3613 | 6.90 |
| | 500 | 1669 | 3758 | 6.83 |
| | 500 | 1488 | 3421 | 7.67 |
| | 500 | 1472 | 3409 | 7.67 |
| | 500 | 1420 | 3415 | 7.58 |
| benzylamine | 0 | 783 | 1031 | 7.06 |
| | 0 | 771 | 970 | 6.44 |
| | 0 | 794 | 973 | 5.80 |
| | 7.9 | 1421 | 2039 | 2.97 |
| | 7.9 | 1409 | 1942 | 2.38 |
| | 7.9 | 1426 | 1954 | 2.34 |
| | 15 | 1355 | 2022 | 3.71 |
| | 15 | 1352 | 1805 | 2.41 |
| | 15 | 1336 | 1792 | 2.40 |
| | 25.6 | 1315 | 1885 | 3.51 |
| | 25.6 | 1304 | 1670 | 2.11 |
| | 25.6 | 1298 | 1676 | 2.34 |
| pyridine | 0 | 1041 | 1266 | 5.4 |
| | 0 | 1038 | 1246 | 4.6 |
| | 0 | 1034 | 1194 | 4.2 |
| | 0 | 1034 | 1188 | 4.0 |
| | 5.1 | 1059 | 1233 | 3.7 |
| | 5.1 | 1082 | 1232 | 3.4 |
| | 5.1 | 1052 | 1199 | 3.5 |
| | 10.3 | 1086 | 1241 | 3.3 |
| | 10.3 | 1070 | 1215 | 3.3 |
| | 10.3 | 1077 | 1216 | 3.1 |
| | 20.2 | 1264 | 1536 | 2.8 |
| | 20.2 | 1246 | 1500 | 2.6 |
| | 20.2 | 1266 | 1506 | 2.3 |
| | 34.8 | 1437 | 1806 | 2.1 |
| | 34.8 | 1437 | 1796 | 1.9 |
| | 34.8 | 1449 | 1805 | 1.8 |
| | 49.5 | 1521 | 1942 | 1.7 |
| | 49.5 | 1510 | 1934 | 1.7 |
| | 49.5 | 1509 | 1926 | 1.4 |
| | 65.5 | 1631 | 2271 | 2.4 |
| | 65.5 | 1629 | 2252 | 2.2 |
| | 65.5 | 1624 | 2226 | 2.0 |
| | 80.3 | 1719 | 2367 | 1.1 |
| | 80.3 | 1714 | 2355 | 1.1 |
| | 80.3 | 1715 | 2362 | 1.1 |
| | 99.8 | 1786 | 2542 | 1.1 |
| | 99.8 | 1781 | 2532 | 1.1 |
| | 99.8 | 1769 | 2516 | 1.1 |
| | 124.8 | 1793 | 2677 | 1.3 |
| | 124.8 | 1794 | 2709 | 1.2 |
| | 124.8 | 1833 | 2712 | 1.3 |
| | 149.8 | 1739 | 2426 | 1.0 |
| | 149.8 | 1737 | 2352 | 0.6 |
| | 149.8 | 1729 | 2365 | 0.5 |
| | 174.8 | 1726 | 2353 | 0.5 |
| | 174.8 | 1737 | 2340 | 0.4 |
| | 174.8 | 1739 | 2358 | 0.4 |
| | 224.7 | 1740 | 2429 | 1.1 |
| | 224.7 | 1733 | 2393 | 1.0 |
| | 224.7 | 1719 | 2400 | 1.0 |
| | 278.3 | 1740 | 2456 | 1.0 |
| | 278.3 | 1749 | 2458 | 0.9 |
| | 278.3 | 1755 | 2450 | 0.7 |
| | 414 | 1734 | 2484 | 1.2 |
| | 414 | 1733 | 2469 | 1.1 |
| | 414 | 1718 | 2437 | 0.9 |
| | 600 | 1670 | 2432 | 1.6 |
| | 600 | 1691 | 2418 | 1.3 |
| | 600 | 1682 | 2388 | 1.2 |
| | 802 | 1649 | 2366 | 1.5 |
| | 802 | 1646 | 2346 | 1.4 |
| | 802 | 1648 | 2334 | 1.3 |
| | 1002 | 1607 | 2336 | 1.9 |
| | 1002 | 1599 | 2335 | 2.0 |
| | 1002 | 1619 | 2291 | 1.6 |
| | 1498 | 1637 | 2525 | 2.7 |
| | 1498 | 1607 | 2493 | 2.6 |
| | 1498 | 1613 | 2503 | 2.5 |
| | 1995 | 1548 | 2436 | 3.4 |
| | 1995 | 1536 | 2400 | 3.2 |
| | 1995 | 1543 | 2405 | 3.3 |
| | 2496 | 1379 | 2037 | 3.6 |
| | 2496 | 1385 | 2016 | 3.3 |
| | 2496 | 1398 | 2015 | 3.2 |
| | 2990 | 1331 | 1998 | 4.0 |
| | 2990 | 1325 | 1946 | 3.8 |
| | 2990 | 1319 | 1933 | 3.8 |
| | 3500 | 1235 | 1822 | 4.5 |
| | 2500 | 1266 | 1852 | 4.1 |
| | 2500 | 1259 | 1828 | 4.1 |
| | 4000 | 1198 | 1774 | 4.8 |
| | 4000 | 1204 | 1739 | 4.4 |
| | 4000 | 1198 | 1742 | 4.5 |
| quinoline | 0 | 936 | 1152 | 5.94 |
| | 0 | 937 | 1087 | 4.91 |
| | 0 | 894 | 1002 | 4.85 |
| | 0 | 990 | 1288 | 5.94 |
| | 6.6 | 1178 | 1392 | 3.44 |
| | 6.6 | 1183 | 1535 | 4.41 |
| | 6.6 | 1192 | 1442 | 3.45 |
| | 12.6 | 1419 | 1777 | 2.65 |
| | 12.6 | 1392 | 1702 | 2.57 |
| | 12.6 | 1372 | 1681 | 2.43 |
| | 24.9 | 1534 | 2002 | 2.31 |
| | 24.9 | 1498 | 1978 | 1.75 |
| | 24.9 | 1542 | 1965 | 2.07 |
| | 49.2 | 1723 | 2801 | 3.91 |
| | 49.2 | 1731 | 2755 | 3.99 |
| | 49.2 | 1749 | 2795 | 3.97 |
| | 74.3 | 1774 | 2718 | 2.38 |
| | 74.3 | 1765 | 2714 | 2.58 |
| | 74.3 | 1727 | 2579 | 2.13 |
| | 100.1 | 1819 | 2680 | 1.34 |
| | 100.1 | 1869 | 2790 | 1.75 |
| | 100.1 | 1852 | 2758 | 1.80 |
| | 100.1 | 1823 | 2730 | 1.30 |
| | 100.1 | 1859 | 2733 | 1.31 |
| benzonitrile | 0 | 872 | 1199 | 6.79 |
| | 0 | 883 | 1193 | 6.85 |
| | 5 | 1187 | 1706 | 4.58 |
| | 5 | 1197 | 1648 | 3.90 |
| | 10 | 1277 | 1965 | 4.78 |
| | 10 | 1267 | 1960 | 4.70 |
| | 20 | 1354 | 2429 | 5.18 |
| | 20 | 1380 | 2189 | 4.30 |
| | 50 | 1440 | 2518 | 4.30 |
| | 50 | 1459 | 2394 | 3.90 |
| | 100 | 1435 | 2704 | 5.32 |
| | 100 | 1438 | 2726 | 5.45 |
| | 200 | 1284 | 2758 | 7.55 |
| | 200 | 1325 | 2459 | 6.36 |
| | 200 | 1362 | 2584 | 5.51 |
| | 200 | 1418 | 2552 | 5.01 |
| | 250 | 1386 | 2476 | 5.22 |
| | 250 | 1390 | 2434 | 4.98 |

From the test results given in the Table, utilizing representative examples of amines according to the invention, the improvements of the operating condition performance, taken from actual measurements of the laboratory bench test system as well as calculated values for fluid film heat transfer coefficients ($h_o$) are shown. Additionally, the absorber power load increases are shown as are the significant decreases in solution subcooling at the operating conditions. Calculated values of film heat transfer coefficients ($h_o$) are also increased.

We claim:

1. A water vapor absorption cycle cooling and/or heating system containing an aqueous working fluid consisting essentially of water as the solvent and comprising between about 30% and about 85%, by weight, of a metal compound selected from the group consisting of lithium bromide, lithium chloride, lithium iodide and mixtures of two or more thereof, sodium hydroxide, potassium hydroxide and mixtures of said hydroxides, and an effective additive amount of at least 2 parts per million, by weight, of an aliphatic, cycloaliphatic, heterocyclic, or aromatic amine having between 4 and 20 carbon atoms, capable of increasing the rate of water vapor sorption of said working fluid.

2. A system of claim 1 comprising single or double effect absorption apparatus and wherein said metal compound comprises lithium bromide.

3. A system of claim 2 wherein said amine comprises a primary, secondary or tertiary aliphatic or cycloaliphatic amine having between 6 and 12 carbon atoms.

4. A system of claim 2 wherein said amine comprises a cycloaliphatic amine.

5. A system of claim 2 wherein said amine comprises an aromatic amine.

6. A system of claim 5 wherein said aromatic amine has between 4 and 12 carbon atoms.

7. A system of claim 6 wherein said aromatic amine is a halogen substituted amine.

8. A system of claim 6 wherein said amine is quinoline or isoquinoline.

9. A system of claim 6 wherein said amine is benzylamine.

10. A system of claim 2 wherein said amine is aniline or a substituted aniline.

11. A system of claim 10 wherein said substituted aniline is a halogen substituted aniline.

12. A system of claim 2 wherein said amine is an isomer of diaminocyclohexane.

13. A system of claim 2 wherein said amine is octylamine.

14. A system of claim 2 wherein said amine is nonylamine.

15. A system of claim 2 wherein said amine is decylamine.

16. A system of claim 2 wherein said amine is ethylhexyl amine.

17. A system of claim 2 where said amine is 2-ethylhexylamine.

18. A system of claim 3 wherein said amine is dimethylhexylamine.

19. A system of claim 3 wherein said amine is N,N-diisopropylethylamine.

20. A system of claim 3 wherein said amine is N,N-dimethyloctylamine.

21. A system of claim 3 wherein said amine is N,N-diethyloctylamine.

22. A system of claim 3 wherein said amine is a saturated heterocyclic amine.

23. A system of claim 22 wherein said amine is piperidine.

24. A system of claim 23 wherein said piperidine is methyl substituted.

25. A system of claim 23 wherein said piperidine is fluoro substituted.

26. A system of claim 22 wherein said amine is pyrrolidine.

27. A system of claim 2 wherein said amine is an unsaturated heterocyclic amine.

28. A system of claim 27 wherein said amine is pyridine.

29. A system of claim 28 wherein said pyridine is methyl or fluoro substituted.

30. A system of claim 27 wherein said amine is pyrrole.

31. A system of claim 30 wherein said pyrrole is methyl or fluoro substituted.

32. A system of claim 27 wherein said amine is pyrroline.

33. A system of claim 2 wherein said amine is a methyl diaminopentane.

34. A system of claim 2 wherein said working fluid contains a mixture of two or more of said amines.

35. A system of claim 1 wherein said amine is a liquid at temperatures of between about 30° C. and about 100° C.

36. A system of claim 1 wherein said additive amount is between 2 ppm and about 20,000 ppm, by weight.

37. A system of claim 2 wherein said additive amount is between 2 ppm and about 10,000 ppm, by weight.

38. A system of claim 2 wherein said aqueous working fluid contains lithium bromide and one or more salts selected from the group consisting of $ZnCl_2$, $ZnBr_2$, $MnCl_2$, $MnBr_2$, $MgCl_2$, $MgBr_2$, $SrCl_2$, $SrBr_2$, $CaCl_2$, $CaBr_2$, $FeCl_2$, $FeBr_2$, LiCl, LiI, $LiNO_2$, $LiNO_3$, LiSCN and $LiClO_3$.

39. A single or double effect water vapor absorption cycle cooling and/or heating system containing an aqueous working fluid consisting essentially of water as the solvent and having between about 40% and about 85% by weight lithium bromide, and an effective additive amount of at least 2 parts per million, by weight, of a primary, secondary or tertiary aliphatic, cycloaliphatic, heterocyclic or aromatic amine capable of increasing the rate of water vapor sorption of said working fluid.

40. A system of claim 39 wherein said amine is a liquid at temperatures of between about 30° C. and about 100° C.

41. A system of claim 39 wherein said amine comprises an aliphatic amine having between 4 and 20 carbon atoms.

42. A system of claim 39 wherein said amine comprises a cyclohexylamine.

43. A system of claim 39 wherein said amine comprises an aromatic amine.

44. A system of claim 43 wherein said aromatic amine has between 4 and 12 carbon atoms.

45. A system of claim 39 wherein said amine is a heterocyclic amine.

46. A system of claim 39 wherein said amine is aniline or a substituted aniline.

47. A system of claim 39 wherein said amine is 2-ethylhexyl amine.

48. A system of claim 39 wherein said amine is dimethyloctylamine.

49. A system of claim 39 wherein said amine is piperidine or substituted piperidine.

50. A system of claim 39 wherein said amine is pyrrolidine.

51. A system of claim 39 wherein said amine is pyrrole.

52. A system of claim 39 wherein said amine is diisopropylethylamine.

53. A system of claim 39 wherein said amine is pyridine or a substituted pyridine.

54. A system of claim 39 wherein said amine is quinoline or isoquinoline.

55. A system of claim 39 wherein said amine is benzylamine.

56. A system of claim 39 wherein said amine comprises a diamine.

57. A system of claim 39 wherein said working fluid contains a mixture of two or more amines.

58. A system of claim 39 wherein said effective additive amount is between 2 ppm and about 20,000 ppm, by weight.

59. A system of claim 39 wherein said aqueous working fluid includes, in addition to said lithium bromide, one or more salts selected from the group consisting of $ZnCl_2$, ZnBr$_2$, MnCl$_2$, MnBr$_2$, MgCl$_2$, MgBr$_2$, SrCl$_2$, SrBr$_2$, CaCl$_2$, CaBr$_2$, FeCl$_2$, FeBr$_2$, LiCl, LiI, LiNO$_2$, LiNO$_3$, LiSCN and LiClO$_3$.

60. In operation of an absorption cycle cooling and/or heating system including an absorber containing an aqueous metal salt or metal hydroxide absorption solution for absorbing water vapor therein wherein water is the only substantial solvent and said metal salt is an alkali metal halide, and said metal hydroxide is sodium hydroxide, potassium hydroxide or mixtures of said hydroxides, a method of improving the rate of water vapor absorption of said absorption solution comprising adding thereto an effective additive amount of between 2 and about 20,000 parts per million, by weight, of a primary, secondary or tertiary aliphatic, cycloaliphatic, heterocyclic or aromatic amine capable of increasing said rate of water vapor absorption.

61. A method of claim 60 wherein said amine is a liquid at temperatures of between about 30° C. and about 100° C.

62. A method claim 60 wherein said amine comprises an aliphatic amine having between 4 and 20 carbon atoms.

63. A method of claim 60 wherein said amine comprises an aromatic amine having between 6 and 12 carbon atoms.

64. A method of claim 60 wherein said amine is a cyclohexylamine.

65. A method of claim 60 wherein said amine is aniline or a substituted aniline.

66. A method of claim 60 wherein said amine is a diamine.

67. A method of claim 60 wherein said amine is 2-ethylhexylamine.

68. A method of claim 60 wherein said amine is dimethyloctylamine.

69. A method of claim 60 wherein said amine is piperidine or substituted piperidine.

70. A method of claim 60 wherein said amine is pyrrolidine.

71. A method of claim 60 wherein said amine is pyrrole.

72. A method of claim 60 wherein said amine is diisopropylethylamine.

73. A method of claim 60 wherein said amine is benzyl amine.

74. A method of claim 60 wherein said amine is pyridine or a substituted pyridine.

75. A method of claim 60 wherein said alkali metal halide is lithium bromide.

76. A method of claim 75 wherein said aqueous working fluid includes, in addition to said lithium bromide, one or more salts selected from the group consisting of ZnCl$_2$, ZnBr$_2$, MnCl$_2$, MnBr$_2$, MgCl$_2$, MgBr$_2$, SrCl$_2$, SrBr$_2$, CaCl$_2$, CaBr$_2$, FeCl$_2$, FeBr$_2$, LiCl, LiI, LiNO$_2$, LiNO$_3$, LiSCN and LiClO$_3$.

77. A system of claim 75 wherein said additive amount is between 2 ppm and about 10,000 ppm, by weight.

78. A system of claim 1 wherein said metal compound is sodium hydroxide, potassium hydroxide or mixtures thereof and said amine is a saturated heterocyclic amine.

79. A system of claim 78 wherein said amine is piperidine.

80. A system of claim 79 wherein said piperidine is methyl or fluoro substituted.

81. A system of claim 78 wherein said amine is pyrrolidine.

82. A system of claim 1 wherein said metal compound is sodium hydroxide, potassium hydroxide or mixtures thereof and said amine is an unsaturated heterocyclic amine.

83. A system of claim 82 wherein said amine is pyridine.

84. A system of claim 83 wherein said pyridine is methyl or fluoro substituted.

85. A system of claim 82 wherein said amine is pyrrole.

86. A system of claim 85 wherein said pyrrole is methyl or fluoro substituted.

87. A system of claim 82 wherein said amine is pyrroline.

88. A system of claim 1 wherein said metal compound is sodium hydroxide, potassium hydroxide or mixtures thereof and said amine is quinoline or isoquinoline.

89. A system of claim 1 wherein said metal compound is sodium hydroxide, potassium hydroxide or mixtures thereof and said amine is benzylamine.

* * * * *

UNITED STATES PATENT AND TRADEMARK OFFICE
CERTIFICATE OF CORRECTION

PATENT NO. : 5,577,388
DATED : November 26, 1996
INVENTOR(S) : Travis Chnadler, et. al.

It is certified that error appears in the above-identified patent and that said Letters Patent is hereby corrected as shown below:

Title page, item [73], Assignee: change "Nebr." to --Nevada--.

Signed and Sealed this

Sixth Day of April, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT : 5,577,388

DATED : November 26, 1996

INVENTOR(S) : Travis Chandler; Uwe Rockenfeller

It is certified that error appears in the above-identified patent and that said Letters Patent is hereby corrected as shown below:

Title page (first page), section [73], please change "Nebr." to --Nev.--.

This certificate supersedes Certificate of Correction issued April 6, 1999.

Signed and Sealed this

Twentieth Day of June, 2000

Attest:

Q. TODD DICKINSON

*Attesting Officer*      *Director of Patents and Trademarks*